(12) United States Patent
Grandinetti et al.

(10) Patent No.: US 8,301,076 B2
(45) Date of Patent: Oct. 30, 2012

(54) SYSTEM AND METHOD FOR DISTRIBUTED AUDIO RECORDING AND COLLABORATIVE MIXING

(75) Inventors: David Grandinetti, Syracuse, NY (US); James Howison, Syracuse, NY (US); Ian Molloy, West Lafayette, IN (US)

(73) Assignee: Syracuse University, Syracuse, NY (US)

(*) Notice: Subject to any disclaimer, the term of this patent is extended or adjusted under 35 U.S.C. 154(b) by 811 days.

(21) Appl. No.: 12/194,205

(22) Filed: Aug. 19, 2008

(65) Prior Publication Data

US 2009/0068943 A1 Mar. 12, 2009

Related U.S. Application Data

(60) Provisional application No. 60/965,581, filed on Aug. 21, 2007.

(51) Int. Cl.
*H04H 40/00* (2008.01)
(52) U.S. Cl. ............ 455/3.06; 455/3.01; 455/3.02; 455/3.03; 455/3.04; 455/3.05; 381/119; 381/122; 700/94; 700/96
(58) Field of Classification Search ......... 455/3.01–3.06; 381/119, 122; 700/94, 96
See application file for complete search history.

(56) References Cited

U.S. PATENT DOCUMENTS

| | | | |
|---|---|---|---|
| 7,084,898 B1 | 8/2006 | Firestone et al. | |
| 7,191,023 B2 | 3/2007 | Williams | |
| 7,711,443 B1* | 5/2010 | Sanders et al. | 700/94 |
| 7,825,322 B1* | 11/2010 | Classen et al. | 84/622 |
| 2002/0015504 A1 | 2/2002 | Kohno et al. | |
| 2003/0169330 A1 | 9/2003 | Shachar et al. | |
| 2005/0201301 A1* | 9/2005 | Bridgelall | 370/254 |
| 2006/0130636 A1 | 6/2006 | Toledano et al. | |
| 2007/0039449 A1 | 2/2007 | Redmann | |
| 2007/0111657 A1* | 5/2007 | Yamada et al. | 455/3.01 |

(Continued)

FOREIGN PATENT DOCUMENTS

KR 1020010004504 1/2001

(Continued)

OTHER PUBLICATIONS

Patent Corporation Treaty International Searching Authority, Notification of Transmittal of the International Search Report and the Written Opinion of the International Searching Authority, or the Declaration (Form PCT/ISA/220), dated Dec. 11, 2008, 3 pgs.

(Continued)

*Primary Examiner* — Fayyaz Alam
(74) *Attorney, Agent, or Firm* — Heslin Rothenberg Farley & Mesiti P.C.; George S. Blasiak, Esq.

(57) ABSTRACT

Two or more wireless devices can be independently controlled by their respective users, a mixer component, or a leader wireless device to perform audio recording, convert the recorded audio into a standard or proprietary audio stream format, and transmit the audio stream to a server. The real-time clocks of two or more participating wireless devices can be synchronized. A wireless device can insert timestamps into the audio stream to facilitate the mixing operation. Mixing of the two or more audio streams recorded by wireless devices can be performed by a mixer component either in real time (contemporaneously with the recording) or asynchronously with respect to the recording. The mixing can be performed in a fully automated mode, and/or in an operator-assisted mode.

18 Claims, 3 Drawing Sheets

U.S. PATENT DOCUMENTS

2007/0127671 A1    6/2007    Chua et al.
2007/0140510 A1    6/2007    Redmann

FOREIGN PATENT DOCUMENTS

KR           100469472       1/2005
KR      1020060128305      12/2006

OTHER PUBLICATIONS

Patent Cooperation Treaty International Searching Authority, Written Opinion of the International Searching Authority (Form PCT/ISA/237), dated Dec. 11, 2008, 4 pgs.

Patent Cooperation Treaty, International Search Report (Form PCT/ISA/210), dated Dec. 11, 2008, 3 pgs.

Crowston, K., Annabi, H., Howison, J. & Masango, C. (2005a), Effective work practices for Software Engineering: Free/Libre Open Source Software Development, in 'Proc. of Hawaii International Conference on System Sciences (HICSS)'.

Crowston, K., Howison, J. & Annabi, H. (2006), Information systems success in free and open source software development: Theory and measures., Software Process: Improvement and Practice, Special Issue on Free/Open Source Software Processes. 11(2):123-148.

Crowston, K., Annabi, H. & Howison, J. (2003), Defining open source software project success, in 'Proc. of International Conference on Information Systems (ICIS 2003)'.

Conklin, M. S., Howison, J. & Crowston, K. (2005), Collaboration using OSSmole: a repository of FLOSS data and analyses, in 'Proc. of Mining Software Repositories (MSR) Workshop at ICSE', St Louis, Missouri.

Howison, J. & Crowston, K. (2004b), Studying free software with free software and free methods, in '1st Australian Open Source Development Conference'.

Howison, J. & Goodrum, A. (2004), Why can't I manage academic papers like MP3s? The evolution and intent of metadata standards, in 'Proceedings of the 2004 Colleges, Code and Intellectual Property Conference', No. 57 in 'ACRL Publications in Librarianship', College Park, MD.

McKnight, L. W., Howison, J. & Bradner, S. (2004), 'Wireless grids: Distributed resource sharing by mobile, nomadic and fixed devices', IEEE Internet Computing 8(4), 24-31.

McKnight, L. W., Lehr, W. & Howison, J. (2003b), Coordinating User and Device Behaviour in Wireless Grids.

Howison, J. (2003a), An introduction to the literature on online reputation systems for the market management of peer to peer services (MMAPPS) project, Prepared for BTexact Research.

Burns, M. & Howison, J. (2001), 'Napster fabbing: Internet delivery of physical products', *Rapid Prototyping Journal* 7(4), 194-196.

Crowston, K., Wei, K., Li, Q., Eseryel, U. Y. & Howison, J. (2005), Coordination of free/libre and open source software development, in 'Proceedings of International Conference on Information Systems (ICIS 2005)'.

European Patent Office, European Patent Application No. 08798250.0, Communication Pursuant to Rules 70(2) and 70a(2) EPC, dated Jul. 29, 2011 (8 pages).

* cited by examiner

SYSTEM AND METHOD FOR DISTRIBUTED AUDIO RECORDING AND COLLABORATIVE MIXING

CROSS-REFERENCE TO RELATED APPLICATIONS

This application claims priority under 35 U.S.C §119(e) of the following provisional application: U.S. Ser. No. 60/965,581, filed Aug. 21, 2007, entitled "SYSTEM AND METHOD FOR DISTRIBUTED AUDIO RECORDING AND COLLABORATIVE MIXING", the content of which is incorporated herein by reference.

STATEMENT REGARDING FEDERALLY SPONSORED RESEARCH OR DEVELOPMENT

The disclosed invention was made with government support under a grant awarded by the National Science Foundation under Grant No. 0227879. The United States Government has certain rights in the invention.

FIELD OF THE INVENTION

This invention relates generally to wireless devices capable of audio recording, and more specifically to distributed audio recording and collaborative mixing by two or more wireless devices.

BACKGROUND OF THE INVENTION

Wireless devices, such as laptop computers, personal digital assistants (PDAs), cellular phones, etc., bring new resources to distributed computing. In addition to typical computational resources such as CPU, disk space, and applications, wireless devices increasingly employ cameras, microphones, GPS receivers, and other types of sensors. A wireless device by definition has at least one wireless communication interface (e.g., cell, radio frequency, Wi-Fi, or Bluetooth™). Users increasingly take wireless devices with them to new places, in both their personal and professional lives. The ability of wireless devices to form ad-hoc grids allows using the available resources in a collaborative manner, by aggregating information from the range of input/output interfaces found in wireless devices, by leveraging the locations and contexts in which wireless devices are located, and finally, by leveraging the mesh network capabilities of wireless devices. Wireless grids allow coordinated collaboration of heterogeneous inherently unreliable devices, across unreliable network connections. The inherent unreliability of wireless devices is primarily caused by the fact that those devices are, due to their mobile nature, battery-powered. Thus, reducing the power consumption and mitigating the inherent unreliability are two goals of a paramount importance. Thus, there is a need in distributed systems and applications which can assist in achieving both goals by off-loading processing and data management to non-mobile devices, or to wireless devices which can be reachable with less transmitter power.

SUMMARY OF THE INVENTION

There is provided a system for distributed audio recording and collaborative mixing by combining audio streams from two or more sources into a single stream that is composed of two or more channels. Leveraging the spatial location of the devices allows the producing of high quality multi-channel sound (e.g., stereo sound or surround sound).

Two or more wireless devices can be located near a sound source, e.g., at a business meeting, symphony concert, or a live lecture. The wireless devices can be independently controlled by their respective users, by a mixer component, or by a leader wireless device. The wireless devices can convert the recorded audio into a standard or proprietary audio stream format, and transmit the audio stream to a mixer component which can run on a remote computer.

The real-time clocks of two or more participating wireless devices can be synchronized. A wireless device can insert timestamps into the audio stream to facilitate the mixing operation.

Mixing of the two or more audio streams recorded by wireless devices can be performed by a mixer component either in real time (contemporaneously with the recording) or asynchronously with respect to the recording. The mixing can be performed in a fully automated mode, and/or in an operator-assisted mode.

BRIEF DESCRIPTION OF THE DRAWINGS

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is provided a system for distributed audio recording and collaborative mixing, by combining audio streams from multiple sources into a single stream that is composed of multiple channels. Leveraging the spatial location of the devices allows to produce high quality multi-channel sound (e.g., stereo sound or surround sound).

Figure 1:
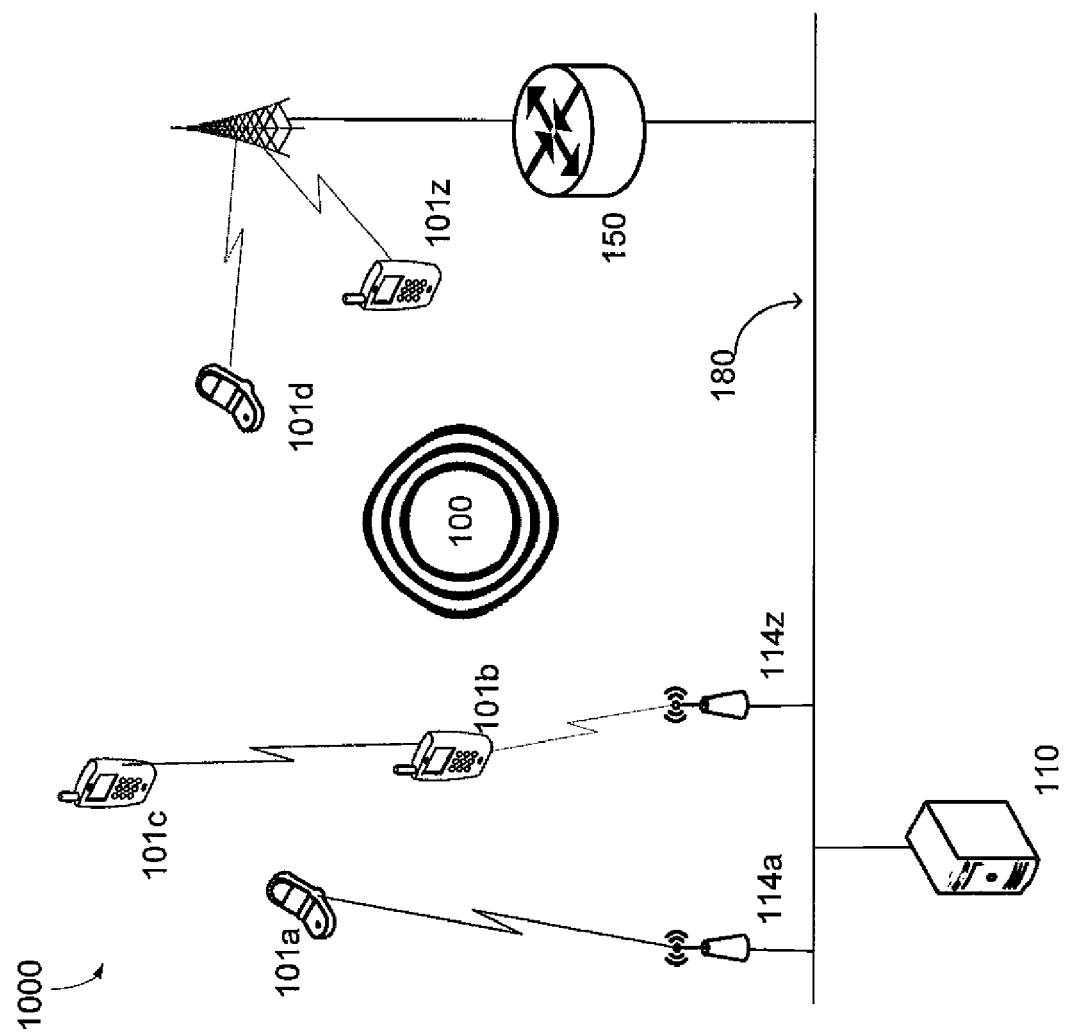
FIG. 1 illustrates a network level view of a sample embodiment of a system for distributed audio recording and collaborative mixing

FIG. 1 illustrates a network level view of a sample embodiment of a system 1000 for distributed audio recording and collaborative mixing. Two or more wireless devices 101a-101z can be located near the sound source 100, e.g., at a business meeting, a symphony concert, or a live lecture. The wireless device 101 can include a central processing unit (CPU), a memory, a wireless communications interface (e.g., cell, radio frequency, Wi-Fi, or Bluetooth™), a battery, and a microphone. The wireless device 101 can be provided, e.g., by a cellular phone, a personal digital assistant, a handheld computer, etc.

The wireless devices 101a-101z can have a user interface and/or an application programming interface (API) allowing to at least start and stop the audio recording and streaming operations. In one embodiment, the wireless devices 101a-101z can be independently controlled by their respective users via a user interface. In another embodiment, the wireless devices 101a-101z can register with and be controlled by a mixer component (not shown in FIG. 1).

The mixer component can run on a remote computer 110. A "computer" herein shall refer to a programmable device for data processing, including a central processing unit (CPU), a memory, and at least one communication interface. A computer can be provided, e.g., by a personal computer (PC) running the Linux operating system.

Computer 110 can be connected to network 180. While different networks are designated herein, it is recognized that a single network as seen from the network layer of the Open System Interconnection (OSI) model can comprise a plurality of lower layer networks (e.g., what can be regarded as a single IP network, can include a plurality of different physical networks).

In one aspect, wireless device 101a-101c can be provided by a PDA and can connect to network 180 via a wireless access point 114a-114z. In another aspect, wireless device 101d-101z can be provided by a cellular phone and can connect to network 180 via General Packet Radio Service (GPRS) gateway 150.

The mixer component can transmit control messages to the wireless devices 101a-101z. The control messages can be encapsulated into, e.g., Blocks Extensible Exchange Protocol (BEEP). The control messages can include a start recording message and a stop recording command.

Upon receiving a start recording command, the wireless device 101 can activate its microphone to start recording. In one embodiment, the wireless device can start transmitting the recorded audio stream back to the mixer component in real time (synchronously with the recording). In another embodiment, the wireless device can buffer the audio stream being recorded and, asynchronously with respect to the recording, transmit the buffered stream back to the mixer component. In a yet another embodiment, the wireless device can store the recorded audio stream in its memory for later transmission to a mixer component.

Upon receiving a stop recording command, the wireless device 101 might stop recording audio stream. In one embodiment, the wireless device might further stop any synchronous transmission of the audio stream to the mixer component. In another embodiment, the wireless device 101 can further complete any asynchronous transmission of a buffered audio stream to a mixer component.

In another embodiment, the wireless devices 101a-101z can elect a leader wireless device which will coordinate the recording by other participating wireless devices. The leader election can be performed, e.g., using an algorithm described in "A Leader Election Protocol For Fault Recovery In Asynchronous Fully-Connected Networks" by M. Franceschetti and J. Bruck, available at http://caltechparadise.library-.caltech.edu/31/00/etr024.pdf.

A skilled artisan would appreciate the fact that any other suitable algorithm of the leader election can be used without departing from the scope and spirit of the invention.

The wireless devices 101a-101z can convert the recorded audio into a standard or proprietary audio stream format, e.g., MPEG-3, RealAudio, Windows Media Audio, etc. The resulting audio stream can be stored by the recording device locally, and/or transmitted to a remote computer 110 via a wireless access point 114 and network 180. Wireless devices with no direct connection to wireless access point can leverage the mesh network capability of a group of wireless devices, e.g., by establishing a wireless mesh network defined in IEEE 80211s.

In one embodiment, wireless devices 101a-101z can have their real-time clocks unsynchronized. In another embodiment, the real-time clocks of two or more participating wireless devices 101a-101z can be synchronized using, e.g., Network Time Protocol (NTP) by Network Working Group, available at ftp://ftp.rfc-editor.org/in-notes/rfc1305.pdf. A wireless device can insert timestamps into the audio stream to facilitate the mixing operation.

Mixing of the two or more audio streams recorded by wireless devices 101a-101z can be performed by a mixer component (not shown in FIG. 1) running on a remote computer 110. The mixing can be performed either in real time (synchronously with the recording) or asynchronously with respect to the recording. Wireless devices 101a-101z can also receive the mixed audio stream back from the mixer, thus allowing the users of wireless devices 101a-101z to listen to the mixed stream.

The mixing can be performed in a fully automated mode, and/or in an operator-assisted mode.

Figure 2:
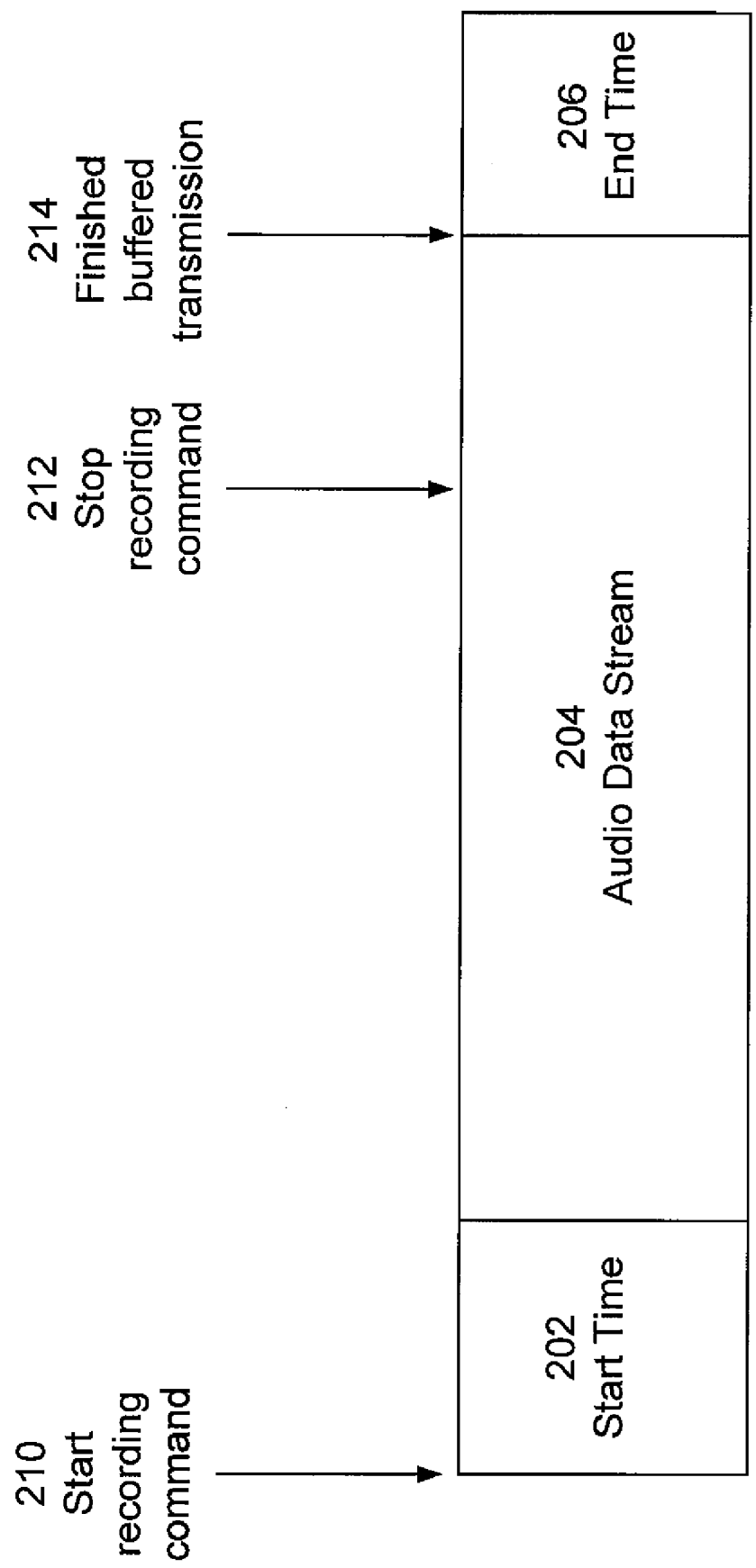
FIG. 2 illustrates the operation of the mixer component in a fully automated mode.

Operation of the mixer component in a fully automated mode is now described with reference to FIG. 2. In one embodiment, the mixing can be performed based upon timestamps included into the audio streams recorded by the individual wireless devices. The wireless device 101 upon receiving a start recording command from a mixer component at time 210, can transmit to the mixer component a message 210 containing the start time timestamp, followed by one or more messages 204 containing the audio stream being recorded. Upon receiving a stop recording command from the mixer component at time 212, the wireless device 101 can stop recording and continue transmitting the buffered audio stream. Upon completing the transmission of the buffered audio stream at time 214, the wireless device 101 can transmit a message 206 containing the timestamp corresponding to time 212 when it stopped the recording. Thus, the mixer component can use the start time and end time of the audio stream file received for synchronizing it with other audio stream files. The mixer component can also calculate a time stamp for any intermediate point of the data stream file by linearly interpolating the start time and end time timestamps.

In another embodiment, where the real-time clocks of the participating wireless devices can not be synchronized reliably, the individual recordings can be synchronized in time based upon one or more clearly distinguishable events present in all the recordings being synchronized. A clearly distinguishable event can be, e.g., a change in the signal amplitude at a given frequency range where the amplitude level changes by a value exceeding a pre-defined amplitude threshold within a time period not exceeding a pre-defined duration.

Figure 3:
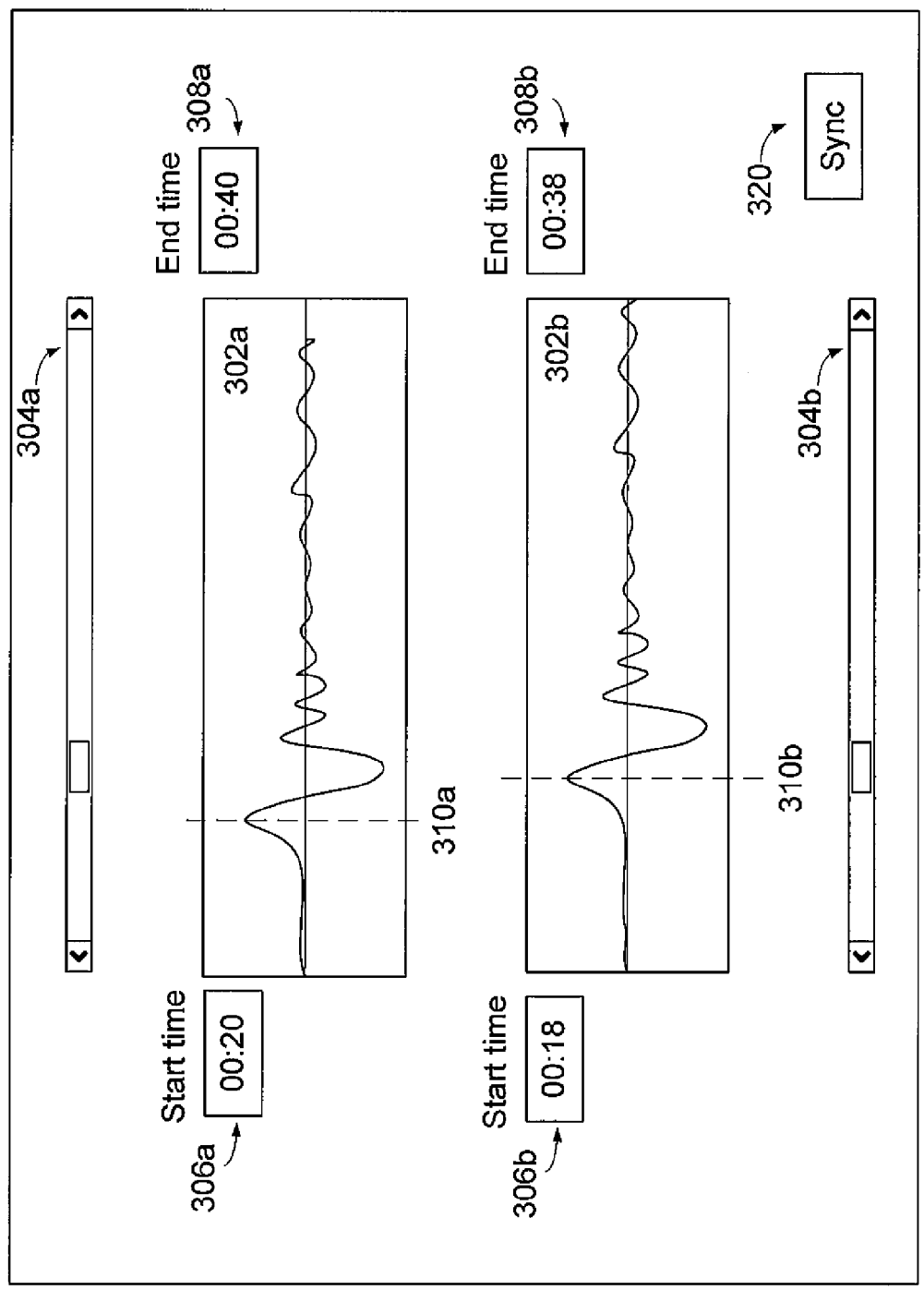
FIG. 3 illustrates a sample graphical user interface (GUI) for the operation of the mixer component in an operator-assisted mode.

The operation of the mixer component in an operator-assisted mode is now described. Graphical representations of the sound waves over two or more sound channels, e.g., graphs of the audio signal amplitude over time, can be presented to the user via a graphical user interface (GUI) as shown in FIG. 3. The GUI can include two or more graph windows 302a, 302b. Each of the graph windows 302a, 302b can show a waveform graph of an audio signal received from a wireless recording device. The GUI can further include two or more scroll bars 304a, 304b using which a user can scroll the respective graphs 302a, 302b along the time axis. The GUI can further have two or more text output fields 306a, 306b where the timestamp corresponding to the start of the audio stream fragment being displayed in the respective graph window 302a, 302b can be automatically displayed according to the position of the respective scroll bar 304a, 304b within the recorded audio stream file. The GUI can further have two or more text output fields 308a, 308b where the timestamp corresponding to the end of the audio stream fragment being displayed in the respective graph 302a, 302b can be automatically displayed according to the position of the respective scroll bar 304a, 304b within the recorded audio stream file.

The user can choose a common point of visual distinction (e.g., a point of rapid signal amplitude change 310a, 310b) and align the graphs using the view slide controls and then pressing the Sync button 320, so that two or more sound channels are synchronized at the common point 310a, 310b.

A small sample of systems methods and apparatus that are described herein is as follows:

A1. A system for distributed audio recording and collaborative mixing comprising:
two or more wireless devices capable of audio recording, wherein said two or more wireless devices are located near a sound source to be recorded;
wherein each wireless device of said two or more wireless devices having an interface allowing at least start and stop audio recording and streaming operations;
wherein each wireless device of said two or more wireless devices being configured to transmit a recorded audio stream to a mixer component; and
a mixer component configured to combine two or more audio streams received from said two or more wireless devices into a multi-channel audio stream by synchronizing in time said two or more audio streams, said synchronization being performed based upon one or more clearly distinguishable events present in all said two or more audio streams.

A2. The system for distributed audio recording and collaborative mixing of A1, wherein said mixer component runs on a remote computer.

A3. The system for distributed audio recording and collaborative mixing of A1, wherein at least one wireless device of said two or more wireless devices is controlled by a user of said at least one wireless device via a user interface.

A4. The system for distributed audio recording and collaborative mixing of A1, wherein at least one wireless device of said two or more wireless devices registers with a mixer component and is controlled by said mixer component via an application program interface.

A5. The system for distributed audio recording and collaborative mixing of A1, wherein at least one wireless device of said two or more wireless devices transmits said recorded audio stream to said mixer component synchronously with said recording.

A6. The system for distributed audio recording and collaborative mixing of A1, wherein at least one wireless device of said two or more wireless devices buffers said recorded audio stream to produce a buffered audio stream, and transmits said buffered audio stream to said mixer component asynchronously with respect to said recording.

A7. The system for distributed audio recording and collaborative mixing of A1, wherein said two or more wireless devices elect a leader device, and wherein said leader device coordinates said audio recording by said one or more wireless devices.

A8. The system for distributed audio recording and collaborative mixing of A1, wherein said synchronizing said two or more recorded audio streams is performed by an operator via a graphical user interface (GUI), said GUI presenting to said operator two or more graphs of said first audio streams, and allowing said operator to align said graphs at said one or more clearly distinguishable events present in said two or more recorded audio streams.

A9. The system for distributed audio recording and collaborative mixing of A1, wherein said synchronizing said two or more recorded audio streams is performed by a mixer component, said mixer component being configured to synchronize one or more clearly distinguishable events present in said two or more recorded audio streams.

B1. A system for distributed audio recording and collaborative mixing comprising:
two or more wireless devices capable of audio recording, wherein said two or more wireless devices are located near a sound source to be recorded, each wireless device of said two or more wireless devices having an interface allowing at least start and stop audio recording and streaming operations, each wireless device of said two or more wireless devices being configured to transmit a recorded audio stream to a mixer component, each wireless device of said two or more wireless devices having a real-time clock, each wireless device of said two or more wireless devices being further configured insert timestamps into said recorded audio stream; and
a mixer component configured to combine two or more audio streams received from said two or more wireless devices into a multi-channel audio stream by synchronizing in time said two or more audio streams based upon said timestamps.

B2. A system for distributed audio recording and collaborative mixing of B1, wherein at least one of said two or more wireless devices is configured to synchronize said real-time clock with an external clock source.

B3. A system for distributed audio recording and collaborative mixing of B1, wherein said mixer component runs on a remote computer.

B4. A system for distributed audio recording and collaborative mixing of B1, wherein at least one wireless device of said two or more wireless devices is controlled by a user of said at least one wireless device via a user interface.

B5. A system for distributed audio recording and collaborative mixing of B1, wherein at least one wireless device of said two or more wireless devices registers with a mixer component and is controlled by said mixer component via an application program interface.

B6. A system for distributed audio recording and collaborative mixing of B1, wherein at least one wireless device of said two or more wireless devices transmits said recorded audio stream to said mixer component synchronously with said recording.

B7 A system for distributed audio recording and collaborative mixing of B1, wherein at least one wireless device of said two or more wireless devices buffers said recorded audio stream to produce a buffered audio stream, and transmits said buffered audio stream to said mixer component asynchronously with respect to said recording.

B8. A system for distributed audio recording and collaborative mixing of B1, wherein said two or more wireless devices elect a leader device, wherein said leader device coordinates said audio recording by said one or more wireless devices.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

The invention claimed is:

1. A system for distributed audio recording and collaborative mixing comprising:
two or more wireless devices capable of audio recording, wherein said two or more wireless devices are located near a sound source to be recorded;
each wireless device of said two or more wireless devices having an interface allowing at least start and stop audio recording and streaming operations;
each wireless device of said two or more wireless devices being configured to transmit a recorded audio stream to a mixer component; and said mixer component configured to combine two or more audio streams received from said two or more wireless devices into a multi-channel audio stream by synchronizing in time said two or more audio streams, said synchronization being performed based upon one or more clearly distinguishable events present in all said two or more audio streams;

wherein at least one clearly distinguishable event of said one or more clearly distinguishable events is provided by a change in an audio signal amplitude at a given frequency range by a value exceeding a pre-defined amplitude threshold within a time period not exceeding a pre-defined duration.

2. The system for distributed audio recording and collaborative mixing of claim 1, wherein said mixer component runs on a remote computer.

3. The system for distributed audio recording and collaborative mixing of claim 1, wherein at least one wireless device of said two or more wireless devices is controlled by a user of said at least one wireless device via a user interface.

4. The system for distributed audio recording and collaborative mixing of claim 1, wherein at least one wireless device of said two or more wireless devices registers with said mixer component and is controlled by said mixer component via an application program interface.

5. The system for distributed audio recording and collaborative mixing of claim 1, wherein at least one wireless device of said two or more wireless devices transmits said recorded audio stream to said mixer component synchronously with said recording.

6. The system for distributed audio recording and collaborative mixing of claim 1, wherein at least one wireless device of said two or more wireless devices buffers said recorded audio stream to produce a buffered audio stream, and transmits said buffered audio stream to said mixer component asynchronously with respect to said recording.

7. The system for distributed audio recording and collaborative mixing of claim 1, wherein said two or more wireless devices elect a leader device, and wherein said leader device coordinates said audio recording by said one or more wireless devices.

8. The system for distributed audio recording and collaborative mixing of claim 1, wherein said synchronizing said two or more recorded audio streams is performed by an operator via a graphical user interface (GUI), said GUI presenting to said operator two or more graphs of said two or more recorded audio streams, and allowing said operator to align said graphs at said one or more clearly distinguishable events present in said two or more recorded audio streams.

9. A system for distributed audio recording and collaborative mixing comprising:

two or more wireless devices capable of audio recording, wherein said two or more wireless devices are located near a sound source to be recorded, each wireless device of said two or more wireless devices having an interface allowing at least start and stop audio recording and streaming operations, each wireless device of said two or more wireless devices being configured to transmit a recorded audio stream to a mixer component, each wireless device of said two or more wireless devices having a real-time clock, each wireless device of said two or more wireless devices being further configured insert timestamps into said recorded audio stream; and said mixer component configured to combine two or more audio streams received from said two or more wireless devices into a multi-channel audio stream by synchronizing in time said two or more audio streams based upon said timestamps;

wherein at least one wireless device of said two or more wireless devices is configured, responsive to receiving a start recording command from said mixer component, to transmit to said mixer component a message containing a start time timestamp followed by one or more messages containing a recorded audio stream.

10. The system for distributed audio recording and collaborative mixing of claim 9, wherein at least one of said two or more wireless devices is configured to synchronize said real-time clock with an external clock source.

11. The system for distributed audio recording and collaborative mixing of claim 9, wherein said mixer component runs on a remote computer.

12. The system for distributed audio recording and collaborative mixing of claim 9, wherein at least one wireless device of said two or more wireless devices is controlled by a user of said at least one wireless device via a user interface.

13. The system for distributed audio recording and collaborative mixing of claim 9, wherein at least one wireless device of said two or more wireless devices registers with said mixer component and is controlled by said mixer component via an application program interface.

14. The system for distributed audio recording and collaborative mixing of claim 9, wherein at least one wireless device of said two or more wireless devices transmits said recorded audio stream to said mixer component synchronously with said recording.

15. The system for distributed audio recording and collaborative mixing of claim 9, wherein at least one wireless device of said two or more wireless devices buffers said recorded audio stream to produce a buffered audio stream, and transmits said buffered audio stream to said mixer component asynchronously with respect to said recording.

16. The system for distributed audio recording and collaborative mixing of claim 9, wherein said two or more wireless devices elect a leader device, wherein said leader device coordinates said audio recording by said one or more wireless devices.

17. The system for distributed audio recording and collaborative mixing of claim 9, wherein said at least one wireless device of said two or more wireless devices is further configured, responsive to receiving a stop recording command from said mixer component, to stop recording said audio stream and continue transmitting one or more buffered messages containing said audio stream.

18. The system for distributed audio recording and collaborative mixing of claim 17, wherein said at least one wireless device of said two or more wireless devices is further configured, responsive to completing said transmission of said one or more buffered messages, to transmit a time stamp corresponding to a time when said wireless device stopped recording said audio stream.

* * * * *